(12) United States Patent
Li (10) Patent No.: US 10,638,223 B2
(45) Date of Patent: Apr. 28, 2020

(54) INFORMATION PROCESSING METHOD AND DEVICE

(71) Applicant: Tencent Technology (Shenzhen) Company Limited, Shenzhen (CN)

(72) Inventor: Wei Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 16/294,422

(22) Filed: Mar. 6, 2019

(65) Prior Publication Data
US 2019/0208319 A1 Jul. 4, 2019

Related U.S. Application Data

(63) Continuation of application No. PCT/CN2017/100711, filed on Sep. 6, 2017.

(30) Foreign Application Priority Data

Oct. 12, 2016 (CN) ............................ 2016 1 0892091

(51) Int. Cl.
*H04R 3/00* (2006.01)
*H04R 5/04* (2006.01)
(Continued)

(52) U.S. Cl.
CPC ............. *H04R 3/005* (2013.01); *G06F 9/542* (2013.01); *H04R 5/027* (2013.01); *H04R 5/04* (2013.01); *H04R 1/406* (2013.01); *H04R 5/033* (2013.01)

(58) Field of Classification Search
CPC .......... H04R 3/005; H04R 5/027; H04R 5/04; H04R 1/406; H04R 5/033; G06F 9/542
See application file for complete search history.

(56) References Cited

U.S. PATENT DOCUMENTS

2017/0289663 A1* 10/2017 Lee ..................... G06F 3/0433

FOREIGN PATENT DOCUMENTS

| CN | 101614803 | 12/2009 |
|---|---|---|
| CN | 102098492 | 6/2011 |

(Continued)

OTHER PUBLICATIONS

International Search Report dated Nov. 29, 2017 in International Application No. PCT/CN2017/100711 with English translation.

(Continued)

*Primary Examiner* — Mark Fischer
(74) *Attorney, Agent, or Firm* — Oblon, McClelland, Maier & Neustadt, L.L.P.

(57) ABSTRACT

A method and a device for information processing are provided. A plurality of sound signals are collected via a plurality of microphones. Next, a combined sound signal for each of at least one pair of the plurality of sound signals is generated by processing circuitry of the information processing device. Each combined sound signal is a combination of a respective pair of the plurality of sound signals. Further, an amplitude difference between the sound signals of each of the at least one pair of the plurality of sound signals is calculated by the processing circuitry. The amplitude difference between the sound signals of each of the at least one pair of the plurality of sound signals is compared with a preset threshold value. A notification message is accordingly generated when the amplitude difference between the sound signals of one or more of the at least one pair of the plurality of sound signals is greater than or equal to the preset threshold value based on the comparison. Subsequently, the notification message is output by the processing circuitry for presentation to a user.

20 Claims, 4 Drawing Sheets

(51) Int. Cl.
    *H04R 5/027*    (2006.01)
    *H04R 5/033*    (2006.01)
    *G06F 9/54*     (2006.01)
    *H04R 1/40*     (2006.01)

(56) References Cited

FOREIGN PATENT DOCUMENTS

| | | |
|---|---|---|
| CN | 103853646 | 6/2014 |
| CN | 105912988 | 8/2016 |
| CN | 106331954 | 1/2017 |
| KR | 10-2016-0070529 | 6/2016 |

OTHER PUBLICATIONS

Written Opinion dated Nov. 30, 2017, issued in International Application No. PCT/CN2017/100711.
Office Action dated Jun. 29, 2018 in Chinese Patent Application No. 201610892091.3 with concise English translation.

\* cited by examiner

INFORMATION PROCESSING METHOD AND DEVICE

RELATED APPLICATION

This application is a continuation of International Application No. PCT/CN2017/100711, filed on Sep. 6, 2017, which claims priority to Chinese Patent Application No. 201610892091.3, entitled "information processing method and device" filed on Oct. 12, 2016. The entire disclosures of the prior applications are hereby incorporated by reference in their entirety.

FIELD OF THE TECHNOLOGY

The present application relates to the technical field of information processing.

BACKGROUND OF THE DISCLOSURE

Along with the development of virtual reality technology, various novel head-wearing devices (or head-wearing apparatus) for enhancing the visual and auditory experience of users appear constantly. Users can play games or watch movies and the like by wearing the head-wearing devices. In order to ensure that the users can get a best audio and video effect, closed design is usually adopted for the head-wearing devices, so as to isolate the contact of the eyes and ears of the users with the outside, thus bringing a more vivid and exciting use effect for the users. For example, immersive head-wearing devices usually used by the users while playing games or watching movies.

SUMMARY

In one embodiment, a method and a device for information processing are provided. A plurality of sound signals are collected via a plurality of microphones. Next, a combined sound signal for each of at least one pair of the plurality of sound signals is generated by processing circuitry of the information processing device. Each combined sound signal is a combination of a respective pair of the plurality of sound signals. Further, an amplitude difference between the sound signals of each of the at least one pair of the plurality of sound signals is calculated by the processing circuitry. The amplitude difference between the sound signals of each of the at least one pair of the plurality of sound signals is compared with a preset threshold value. A notification message is accordingly generated when the amplitude difference between the sound signals of one or more of the at least one pair of the plurality of sound signals is greater than or equal to the preset threshold value based on the comparison. Subsequently, the notification message is output by the processing circuitry for presentation to a user.

In one embodiment, generating the combined sound signal for each of the at least one pair of the plurality of sound signals includes generating the combined sound signal for each of a plurality of random pairs of the plurality of sound signals.

In one embodiment, each of the at least one pair of the plurality of sound signals includes the sound signals captured by adjacent ones of the microphones.

In one embodiment, the method further includes dynamically adjusting the threshold value based on a noise level of an environment in which a head-wearing apparatus to which the notification is output for presentation is used.

In one embodiment, the threshold value is changed according to an average amplitude value of the plurality of sound signals when each amplitude difference between the sound signals is lower than the preset threshold value.

In one embodiment, the notification message includes a voice message or prompt tone, and the outputting includes outputting the voice message or the prompt tone for playback by a head-wearing apparatus.

In one embodiment, the notification message is a graphic or text message, and the outputting includes outputting the graphic message or the text message to a display device of a head-wearing apparatus for display to the user.

In one embodiment, the notification is a vibrating notification message, and the outputting includes sending out a vibrating signal to a vibrating device.

In one embodiment, the method further includes merging the sound signals of each of the at least one pair of the plurality of sound signals having the amplitude difference that is greater than or equal to the preset threshold value, and the outputting includes outputting the merged sound signal for playback by a head-wearing apparatus.

In another embodiment, a head-wearing apparatus is provided. The head-wearing apparatus includes a display device to display an image, a sound playing device that includes at least one speaker to play sound, and a plurality of microphones to capture a plurality of sound signals. The apparatus also includes processing circuitry. The processing circuitry receives the plurality of sound signals captured by the plurality of microphones, and generates a combined sound signal for each of at least one pair of the plurality of sound signals. Each combined sound signal is a combination of a respective pair of the plurality of sound signals. The processing circuitry further calculates an amplitude difference between the sound signals of each of the at least one pair of the plurality of sound signals. After the amplitude difference is obtained, the processing circuitry compares the amplitude difference between the sound signals of each of the at least one pair of the plurality of sound signals with a preset threshold value. A notification message is subsequently generated when the amplitude difference between the sound signals of one or more of the at least one pair of the plurality of sound signals is greater than or equal to the preset threshold value based on the comparison. Next, the notification message is output by the processing circuitry for presentation to a user.

BRIEF DESCRIPTION OF THE DRAWINGS

To describe the technical solutions of the embodiments of the present application more clearly, the following briefly introduces the accompanying drawings required for describing the embodiments. The accompanying drawings in the following description show only some embodiments of the present application, and a person of ordinary skill in the art may still derive other drawings from these accompanying drawings. In the followings.

DESCRIPTION OF EMBODIMENTS

The following describes the technical solutions of the present application with reference to the accompanying drawings. The described embodiments are some of the embodiments of the present application rather than all of the embodiments. All other embodiments obtained by a person of ordinary skill in the art based on the embodiments of the present application shall fall within the protection scope of the present application.

As previously mentioned, in order to bring a more vivid and exciting use experience to a user of a head-wearing device, closed design is usually adopted for the head-wearing device, so as to isolate contact of the eyes and ears of the user with the outside. However, such use manner will cause the result that the user cannot well receive information from the outside while wearing the head-wearing device.

In order to solve the abovementioned problem, the embodiment of the present application provides an information processing method. The method can be used in cooperation with the head-wearing device, so as to process outside information when the user wears and uses the head-wearing device and remind the user when detects that outside information is input.

As previously mentioned, the head-wearing device referred to in the embodiment of the present application can be an immersive head-wearing device, and the head-wearing device itself can comprise a display device used for displaying an image or video, for example, a blinder with an image display function, and a sound playing device used for playing sound, such as a headset.

In addition, in the embodiment of the present application, in order to realize processing on the information from the outside of the head-wearing device, two or more (a plurality of) sound collecting devices need to be configured, so as to collect sound signals in different directions at the periphery of the user of the head-wearing device. The abovementioned two or more sound collecting devices can be configured at different parts of the head-wearing device, or an independent device worn by the user of the head-wearing device can be designed first, for example, a bracelet or a waistband. In such condition, the two or more sound collecting devices are configured at different parts of the device.

Furthermore, in order to better distinguish sound from different directions, the sound collecting devices can be realized by adopting uni-directional microphones.

Figure 1:
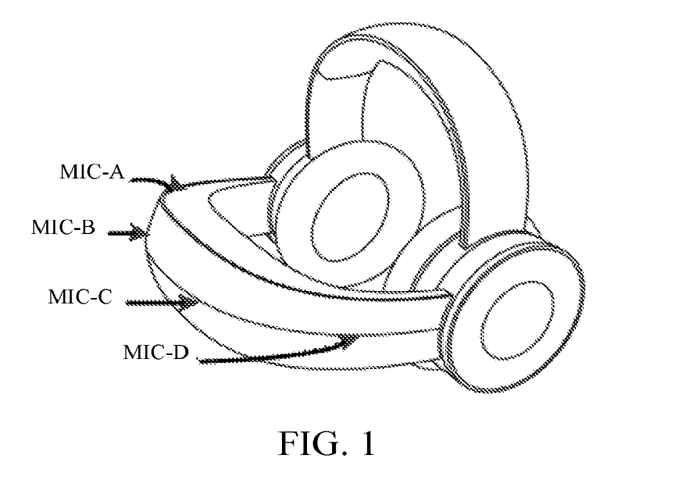
FIG. 1 is an entity schematic diagram of a head-wearing device in the embodiment of the present application.

FIG. 1 shows an example of the head-wearing device of the embodiment of the present application. As shown in FIG. 1, uni-directional microphones MIC-A, MIC-B, MIC-C and MIC-D are respectively arranged at the left part, the left front part, the right part and the right front part of a head-wearing device main body 100 as shown in FIG. 1, and the four uni-directional microphones are respectively configured to capture sound signals coming from the left part, the left front part, the right part and the right front part of the head-wearing device main body. It should be illustrated that totally four sound collecting devices are shown in FIG. 1, while in the embodiment of the present application, the number of sound collecting devices arranged on the head-wearing device main body is not limited to four, and it can be two, three, five, and even more.

The information processing method disclosed by the embodiment of the present application is mainly used for processing sound signals coming from the sound collecting devices, detecting whether useful information is input from the outside, and reminding the user of the head-wearing device when detecting that information is input.

Figure 2:
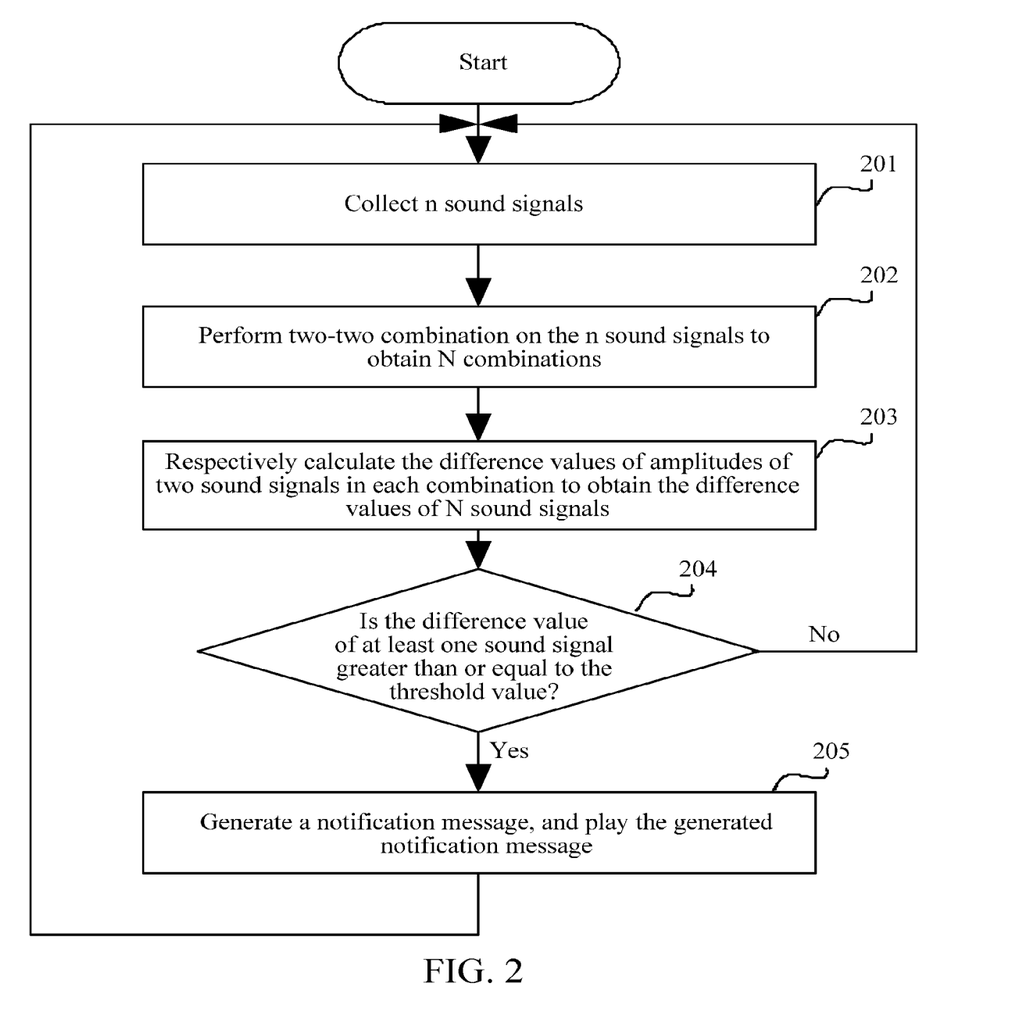
FIG. 2 is a process diagram of an information processing method in the embodiment of the present application.

FIG. 2 is a process diagram of the information processing method in the embodiment of the present application. As shown in FIG. 2, the method comprises the following steps:

Step 201: Respectively collect n sound signals by n sound collecting devices, wherein n is a natural number greater than or equal to 2.

As previously mentioned, in order to realize the method of the embodiment, two or more sound collecting devices can be configured at different parts of the head-wearing device, or an independent device worn by the user is designed, and two or more sound collecting devices are configured at different parts of the device. Therefore, in the present step, two or more sound signals coming from different directions can be collected by the two or more sound collecting devices arranged on the head-wearing device or the independent device.

For example, as shown in the embodiment of the head-wearing device of FIG. 1, the head-wearing device comprises four uni-directional microphones MIC-A, MIC-B, MIC-C and MIC-D. Therefore, in the present step, sound signals Sa, Sb, Sc and Sd coming from four direction, namely, the left part, the left front part, the right part and the right front part, of the head-wearing device can be collected by the four uni-directional microphones MIC-A, MIC-B, MIC-C and MIC-D.

In order to avoid adverse effects of superhigh frequency components in the collected sound signals to the device, in the present step, lowpass filtering processing can be firstly performed on the n sound signals respectively. After lowpass filtering processing, interference elements such as background noise in the received n sound signals will be eliminated.

Step 202: Perform two-two combination (or pair combination) on the n sound signals, so as to obtain N combinations.

In the embodiment of the present application, two-two arbitrary (or random) combination can be performed on the n sound signals, and in such condition, N and n have the following relation: $N=C_n^2$. For example, four sound signals, Sa, Sb, Sc and Sd, can be collected by the head-wearing device as shown in FIG. 1. Therefore, in the present step, the following six combinations can be obtained: [Sa, Sb], [Sa, Sc], [Sa, Sd], [Sb, Sc], [Sb, Sd] and [Sc, Sd].

In another embodiment of the present application, only sound signals collected by two sound collecting devices adjacent in position can be combined according to the positions of the sound collecting devices, wherein each combination includes two sound signals. For example, four sound signals, Sa, Sb, Sc and Sd, can be collected by the head-wearing device as shown in FIG. 1. It can be known from FIG. 1 that, MIC-A is adjacent to MIC-B, MIC-B is adjacent to MIC-C, MIC-C is adjacent to MIC-D, and therefore, in the present step, the following three combinations can be obtained: [Sa, Sb], [Sb, Sc] and [Sc, Sd].

Step 203: Respectively calculate the difference values of the amplitudes of two sound signals in each combination, so as to obtain the difference values of amplitudes of N sound signals.

For example, if the abovementioned six combinations [Sa, Sb], [Sa, Sc], [Sa, Sd], [Sb, Sc], [Sb, Sd] and [Sc, Sd] are obtained in the previous step, the difference values of amplitudes of the two sound signals contained in each combination are respectively calculated: d1=Sa-Sb, d2=Sa-Sc, d3=Sa-Sd, d4=Sb-Sc, d5=Sb-Sd and d6=Sc-Sd. While if the abovementioned three combinations [Sa, Sb], [Sb, Sc] and [Sc, Sd] are obtained in the previous step, the difference values of amplitudes of the two sound signals contained in each combination are respectively calculated: d1=Sa-Sb, d2=Sb-Sc and d3=Sc-Sd.

The difference values of strengths of sound signals received by the sound collecting devices in different directions can be obtained by calculation of the present step, that is the difference values of amplitudes of the sound signals, and these difference values represent the difference of amplitudes of sound in different directions.

In an embodiment of the present application, steps 203 and 204 can be realized by programmable circuits/chips such as a digital signal processing (DSP) chip. Besides, step 204 can also be realized by a gate circuit, such as a differential circuit.

Step 204: Respectively compare the difference values of amplitudes of N sound signals with a set threshold value, judge that information is input from the outside if the difference value of amplitude of at least one sound signal is greater than or equal to the threshold value, and then continue to execute step 205; judge that no information is input from the outside if the difference values of the amplitudes of all sound signal are lower than the threshold value, and returning to step 201 to continue monitoring.

In the present step, the threshold value can be set according to an empirical value in advance. Such threshold value can be kept unchanged during execution of the method.

Furthermore, the threshold value can be set by the user and can be adjusted manually during use. For example, the corresponding relation between different use environments of the head-wearing device and threshold values in various different use environments can be preset, for example, relatively quiet environments including home and the like can correspond to a relatively low threshold value, while relatively noisy environments such as a game center and a shopping mall can correspond to a relatively high threshold value. Therefore, the user can set the use environment of the head-wearing device before use, so as to determine a threshold value corresponding to the use environment set by the user according to the corresponding relation between different use environments and the threshold value, and then achieve the aim of dynamically adjusting the threshold value according to the outside environment.

In addition, in the embodiment of the present application, the threshold value can also be dynamically adjusted according to sound signals collected by two or more sound collecting devices. For example, in the present step, when monitoring that the difference values of amplitudes of all sound signals are lower than the threshold value, the average value of all collected sound signals can be solved, and a new threshold value can be set according to the average value. Because the average value of sound signals collected by multiple sound collecting devices arranged on the head-wearing device basically reflects the amplitude of background sound in the present environment, the threshold value is updated according to the average value so that the head-wearing device is better adapted to the present environment.

Step 205: Generate a notification message, and play the generated notification message so as to notify the user of the head-wearing device that information is input from the outside.

The notification message can be sound message, graphic or text message or messages of other types. For example, if the notification message is a sound message, the sound message can be played by the sound playing device of the head-wearing device, such as specific prompt tone or voice (voice message), so as to notify the user of the head-wearing device that information is input from the outside; if the notification message is a graphic or text message, the graphic or text message can be displayed by the display device of the head-wearing device, so as to notify the user of the head-wearing device. Furthermore, the user can be notified in a manner of vibration and the like.

Besides the abovementioned notifying manners, sound signals possibly containing information corresponding to the difference values of amplitudes of the sound signals, greater than or equal to the threshold value, can be directly merged and filtered, and then played to the user by the sound playing device of the head-wearing device.

Therefore, the user can know that information is input from the outside after receiving the notification message of any type, so as to return to the real environment by interrupting the use of the head-wearing device to restore communication with the outside.

After the abovementioned operation is executed, if the user continues to use the head-wearing device, the process can return to step 201 to continue monitoring.

It can be seen that, in the present embodiment, by processing sound signals collected by the sound collecting devices arranged in different directions and calculating the difference values of amplitudes of the sound signals in different directions, when the strengths of sounds of a certain direction or several directions are greater than other directions, it can be judged that a person speaks to the user in the direction, that is information is input from the outside, and the user can be reminded by triggering a specific notification operation. By using the present method, an effect that the user can be reminded of effective notification of the outside can be realized on the premise of not damaging the tightness of the head-wearing device and not sacrificing the use experience of the user.

Besides the information processing method, the present application also provides a device for realizing the information processing method.

Figure 3:
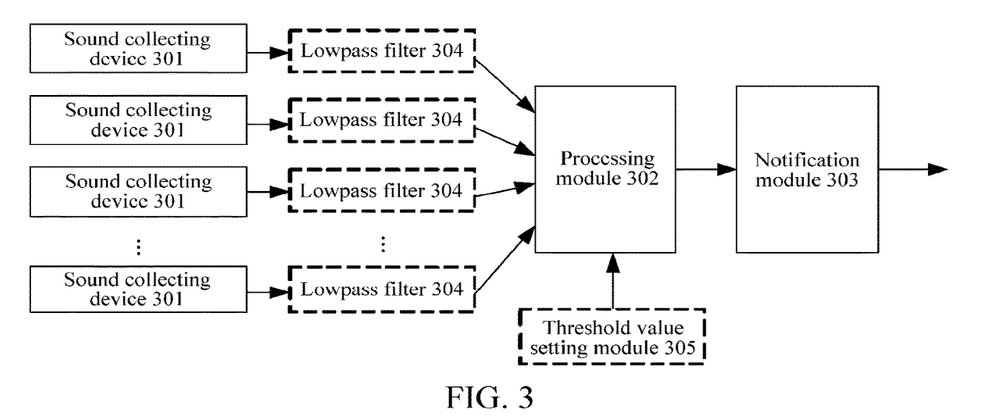
FIG. 3 is a schematic diagram of the internal structure of an information processing device in the embodiment of the present application.

FIG. 3 is the schematic diagram of the internal structure of the information processing device in the embodiment of the present application. In the present embodiment, the information processing device can be built in the head-wearing device and integrated with the head-wearing device. As shown in FIG. 3, the information processing device comprises:

n sound collecting devices 301, wherein n is a natural number greater than 2, and the n sound collecting devices 301 are respectively used for collecting sound signals in different directions.

The n sound collecting devices 301 can be arranged at different positions of the head-wearing device, so as to collect sound signals coming from different directions of the head-wearing device.

For example, the sound collecting devices can be unidirectional microphones. The angles of receiving sound fields of the uni-directional microphones are very small, and thus only having a receiving capacity for sound signals in specific directions, being incapable of receiving signals from other directions. When a person speaks to the user of the head-wearing device, the uni-directivity of the microphones enables the microphone in the direction of the speaker to receive a signal stronger than other microphones.

A processing module 302, which is configured to perform two-two combination on n paths of sound signals undergoing lowpass filtering to obtain N groups of sound signal combinations (or combined sound signal), respectively solve the difference values of amplitudes (or amplitude difference) of sound signals between two paths of sounds of each sound signal combination, compare the obtained difference values of the amplitudes of N sound signals with the set threshold value, and output a control signal to a notification module 303 when the difference value of the amplitude of at least one sound signal equal to the threshold value under the condition that the difference value of amplitude of a certain sound signal or the difference values of amplitudes of several sound signals exceeds/exceed or equals/equal to a set threshold value, which represents that at least one path of sound signal is stronger than other paths of signals, that is, information input possibly exists. Under this condition, the processing module 302 can output a control signal to the notification module 303.

In the embodiment of the present application, the processing module 302 can be realized by adopting different computer processing hardware, such as a DSP chip and a gate circuit.

In some embodiments of the present application, the processing module 302 may also comprise one or more than one memory and one or more than one processor, wherein the one or more than one memory stores one or more than one instruction module, which is configured to be executed by the one or more than one processor; the one or more than one instruction module comprises: a combination module which is configured to perform two-two combination on the n paths of sound signals undergoing lowpass filtering to obtain N groups of sound signal combinations, a comparison module which is configured to respectively solve the difference values of amplitudes of sound signals between two paths of sounds of each sound signal combination and compare the obtained difference values of amplitudes of the N sound signals with the set threshold value, and a determining module which represents that at least one path of sound signal is stronger than other paths of signals when the difference value of amplitude of a certain sound signal or the difference values of amplitudes of several sound signals exceeds/exceed or equals/equal to the set threshold value, that is information input possibly exists.

A notification module 303, which is configured to receive a control signal output by the processing module 302, generate a notification message, and control a display device and/or a sound playing device on the head-wearing device to play the notification message to the user of the head-wearing device so as to remind the user of noticing the input of information from the outside.

In the embodiment of the present application, the notification module 303 can be an instruction module realized by general purpose computer equipment, is stored in the memory of the head-wearing device, and is executed by the processor of the head-wearing device.

In the embodiment of the present application, the notification module 303 can control the display device on the head-wearing device to display a text or graphic message to the user, and also can control the sound playing device on the head-wearing device to send a sound notification to the user.

Furthermore, besides the control signals, the processing module 302 also performs processing of merging and filtering on the sound signal possibly containing information corresponding to the difference values of amplitudes of the sound signals, greater than or equal to the threshold value, and then outputs to the notification module 303, and the notification module 303 controls the sound playing device of the head-wearing device to play the sound signal coming from the processing module 302, so as to directly transfer the outside information to the user of the head-wearing device.

In the embodiment of the present application, the information processing module also comprises: n lowpass filters 304, which are configured to perform lowpass filtering processing on the n paths of sound signals collected by the n sound collecting devices 301 so as to eliminate interference components such as background noise therein, wherein the sound signals undergoing lowpass filtering processing are input into the processing module 302.

In another embodiment of the present application, the information processing device can also comprise a threshold value setting module 305, which is configured to set the threshold value.

The threshold value setting module 305 can receive a threshold value input by the user, and perform threshold value setting according to the threshold value input by the user, or can receive an application scenario set by the user, and determine the threshold value corresponding to the application scenario set by the user according to the preset corresponding relation between the application scenario and the threshold value, so as to perform threshold value setting. Furthermore, the threshold value setting module 305 can also dynamically adjust the threshold value according to the sound signals collected by the n sound collecting devices 301. For example, when the difference values of amplitudes of all sound signals are lower than the set threshold value, it can be illustrated that not information is input, and these sound signals basically reflect the background sound at the periphery of the head-wearing device. In such condition, the threshold value can be updated according to the average value of the sound signals collected by the n sound collecting devices 301.

Figure 4:
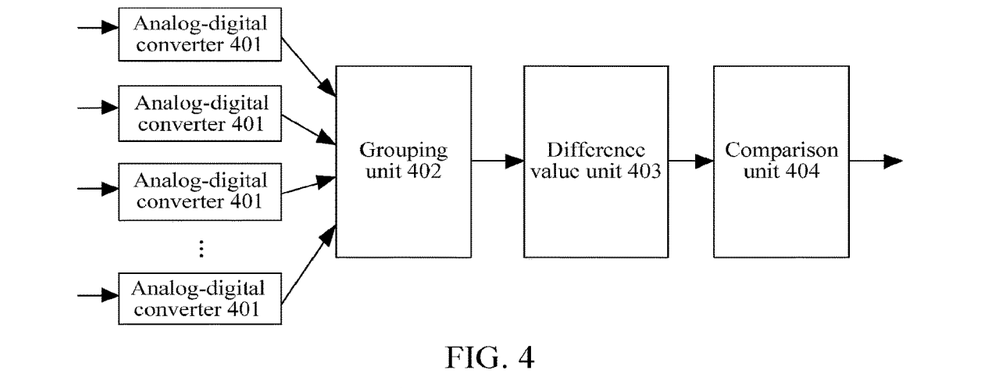
FIG. 4 is a schematic diagram of the internal structure using DSP as a processing module in the embodiment of the present application.

In some embodiments of the present application, the processing module 302 can also be realized by using DSP. FIG. 4 shows the internal structure of the processing module 302 realized by using the DSP. As shown in FIG. 4, in such condition, the processing module 302 comprises:

n analog-digital converters 401, which are configured to convert the input n paths of simulating sound signals into n paths of digital signals;

a grouping unit 402, which is configured to perform two-two combination on the input n paths of digital signals to obtain N combinations; as previously mentioned, two-two arbitrary combination can be performed on the n paths of digital signals, at the moment, $N=C_n^2$; furthermore, sound signals collected by two adjacent sound collecting devices can be combined to obtain N combinations.

a difference value unit 403, which is configured to subtract two signal amplitudes in each combination to obtain the difference values of amplitudes of N sound signals totally; and a comparison unit 404, which is configured to compare the difference values of amplitudes of the N sound signals with the set threshold value, judging that information input from the outside exists if the difference values of amplitudes of one or multiple sound signals are greater than or equal to the threshold value, and outputting a control signal.

Figure 5:
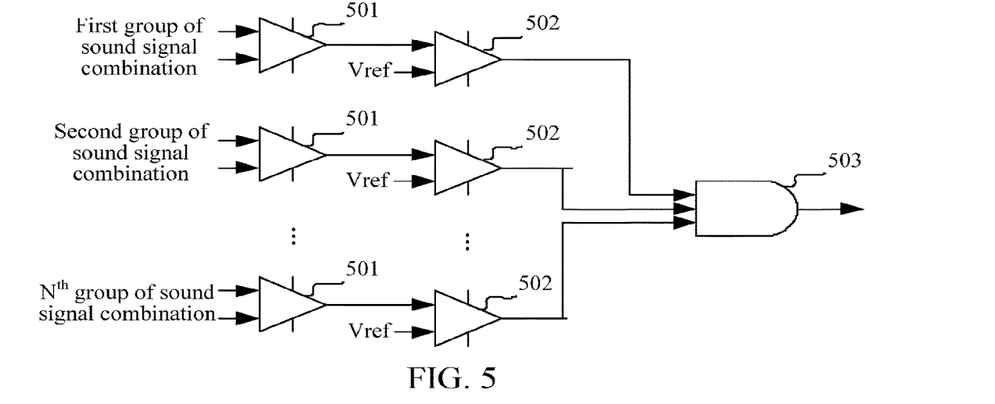
FIG. 5 is a schematic diagram of the internal structure using a gate circuit as a processing module in the embodiment of the present application.

In some other embodiments of the present application, the processing module 302 can also be realized by using a gate circuit. FIG. 5 shows the internal structure of the processing module 302 realized by using the gate circuit. As shown in FIG. 5, in such condition, the processing module 2 comprises:

N differential amplification circuits 501, which are respectively configured to perform subtraction (differential) operation on the amplitudes of two paths of sound signals in different sound signal combinations, wherein small output will be obtained after noise signals with approximating amplitudes undergoes subtraction, while greater output will be obtained if one in two paths of signals is stronger and undergoes subtraction, and the greater output indicates that effective outside feedback input exists.

N comparators 502, which are respectively configured to compare output of the N differential circuits 501 and a preset amplitude Vref. The preset amplitude corresponds to the threshold value.

An or gate circuit 503, which is configured to perform OR operation on data of all the N comparators 502, that is, when the output of one of the N comparators is 1, the output of the or gate circuit 503 is also 1.

The output of the or gate circuit 503 is output to the notification module 304 as a control signal.

No matter DSP or gate circuit is used in the abovementioned embodiment, processing on the collected sound signals coming from each sound signal collecting device can be realized, whether effective information input from the outside exists can be judged according to the processing result, and the corresponding judgment result can also be sent to the notification module to trigger the related operations.

On the premise of not damaging the use effect of the head-wearing device, the information processing device applying to the head-wearing device in the present embodiment can remind the user of the head-wearing device of noticing that information is input from the outside, and interference message can be eliminated in a certain degree.

Figure 6:
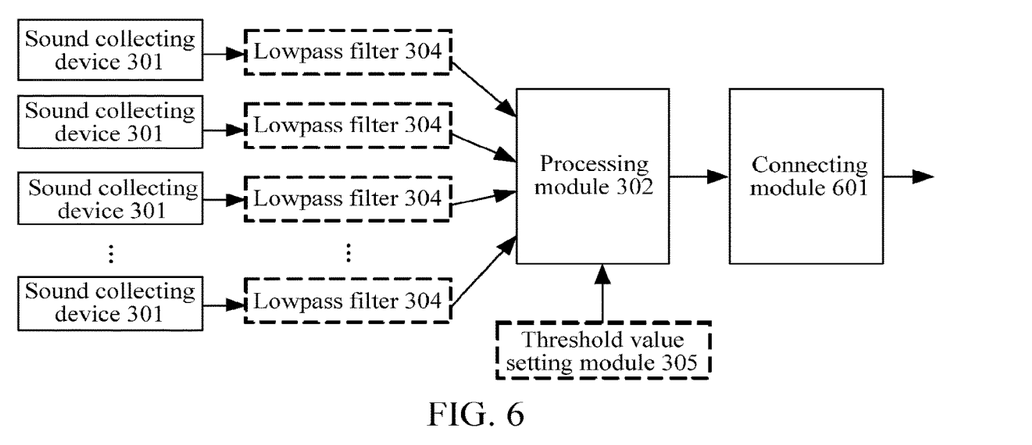
FIG. 6 is a schematic diagram of the interior of an information processing device in another embodiment of the present application.

In another embodiment of the present application, the information processing device can also be configured as an independent information processing part independent from the head-wearing device, and the information processing part is connected with the head-wearing device by a special or universal interface. For example, the information processing part may be an independent part adhered to or plugged to the head-wearing device or may be configured to be a product similar to forms of a bracelet or a waistband to be directly worn on the body of the user. The information processing device may be connected with the head-wearing device in a wired or wireless manner. For example, the information processing device is connected with the head-wearing device by manners of a USB interface, bluetooth or WiFi. FIG. 6 is a schematic diagram of the internal structure of the information processing device of an embodiment of the present application. As shown in FIG. 6, the information processing device comprises:

n sound collecting devices 301, wherein n is a natural number greater than 2, and the n sound collecting devices 301 are respectively configured to collect sound signals in different directions.

The n sound collecting devices 301 may be arranged at different positions of the head-wearing device, or be worn at a certain part of the body of the user of the head-wearing device in manners of a bracelet, a waistband and the like, so as to collect sound signals coming from different directions.

As previously mentioned, the sound collecting devices may be uni-directional microphones.

A processing module 302, which is configured to perform two-two combination on n paths of sound signals undergoing lowpass filtering to obtain N groups of sound signal combinations, respectively solve the difference values of amplitudes of sound signals between two paths of sounds of each sound signal combination, compare the obtained difference values of the amplitudes of N sound signals with the set threshold value, and output a control signal to a connecting module 601 when the difference value of the amplitude of at least one sound signal is greater than or equal to the threshold value that the difference value of amplitude of a certain sound signal or the difference values of amplitudes of several sound signals exceeds/exceed or equals/equal to the set threshold value, which indicates that at least one path of sound signal is stronger than other paths of signals, that is, information input possibly exists.

As previously mentioned, the processing module 302 can be realized by adopting different computer processing hardware, for example, DSP as shown in FIG. 4, or a gate circuit as shown in FIG. 5. Or, the processing module 302 may comprise one or more than one memory and one or more than one processor, wherein the one or more than one memory stores one or more than one instruction module, which is configured to be executed by the one or more than one processor; the one or more than one instruction module comprises: a combination module which is configured to perform two-two combination on the n paths of sound signals undergoing lowpass filtering to obtain N groups of sound signal combinations, a comparison module which is configured to respectively solve the difference values of amplitudes of sound signals between two paths of sounds of each sound signal combination and compare the obtained difference values of amplitudes of the N sound signals with the set threshold value, and a determining module which represents that at least one path of sound signal is stronger than other paths of signals when the difference value of amplitude of a certain sound signal or the difference values of amplitudes of several sound signals exceeds/exceed or equals/equal to the set threshold value, that is information input possibly exists.

A connecting module 601, which is configured to receive a control signal output by the processing module 302, generate a notification message, output the notification message to the head-wearing device, and remind the user of noticing the existence of information input from the outside.

The head-wearing device can display text or graphic message to the user by the display device arranged therein after receiving the notification message coming from the connecting module 601, and also can control the sound playing device on the head-wearing device to send sound notification to the user.

Furthermore, besides the abovementioned notification manners, the processing module 302 can also perform processing of merging and filtering on the sound signal possibly containing information corresponding to the difference values of amplitudes of the sound signals, greater than or equal to the threshold value, and then outputs the processed sound signal to the head-wearing device by the connecting module 601, and the head-wearing device controls the sound playing device arranged therein to play the sound signal, so as to directly transfer the outside information to the user of the head-wearing device.

In another embodiment of the present application, the information processing device may also comprise: n lowpass filters 304 configured to perform lowpass filtering processing on the n paths of sound signals collected by then sound collecting devices 301; and a threshold value setting module 305 configured to set the threshold value, functions thereof are as previously mentioned, and the descriptions thereof are omitted herein.

The information processing device disclosed by the present embodiment can exist by being independent from an immersive head-wearing device, and can notice the head-wearing device to remind the user by a connecting module connected with the head-wearing device after capturing an outside sound signal and judging effective outside information input automatically. Such device has the advantages of being applicable to different head-wearing devices and being more convenient and flexible in use.

Figure 7:
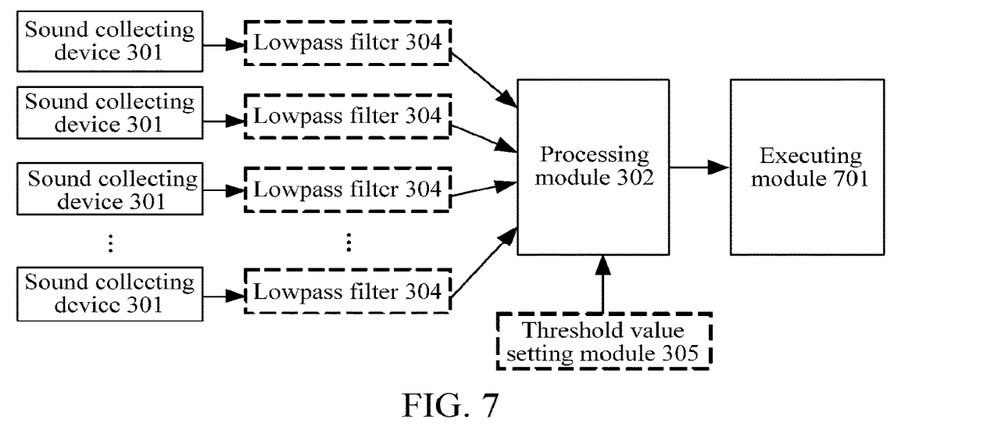
FIG. 7 is a schematic diagram of the interior of an information processing device in further another embodiment of the present application.

In yet another embodiment of the present application, the information processing device can be configured to be an independent device completely independent from the head-wearing device, and does not need to be connected with the head-wearing device. For example, the information processing device may be configured to be a product similar to forms of a bracelet or a waistband to be directly worn on the body of the user. FIG. 7 is a schematic diagram of the internal structure of an information processing device of an embodiment of the present application. As shown in FIG. 7, the information processing device comprises:

n sound collecting devices 301, wherein n is a natural number greater than 2, and the n sound collecting devices 301 are respectively used for collecting sound signals in different directions.

The n sound collecting devices 301 can be arranged at different positions of the head-wearing device, or be worn at the wrist or other parts of the body of the user of the head-wearing device in other manners similar to a bracelet or a waistband so as to collect sound signals coming from different directions of the head-wearing device.

As previously mentioned, the sound collecting devices may be uni-directional microphones.

A processing module 302, which is configured to perform two-two combination on n paths of sound signals undergoing lowpass filtering to obtain N groups of sound signal combinations, respectively solve the difference values of amplitudes of sound signals between two paths of sounds of each sound signal combination, compare the obtained difference values of the amplitudes of N sound signals with the set threshold value, and output a control signal to an executing module 701 under the condition that the difference value of amplitude of a certain sound signal or the difference values of amplitudes of several sound signals exceeds/exceed or equals/equal to a set threshold value, which represents that at least one path of sound signal is stronger than other paths of signals, that is, information input possibly exists As previously mentioned, the processing module 302 can be realized by adopting different computer processing hardware, for example, DSP as shown in FIG. 4, or a gate circuit as shown in FIG. 5. Or, the processing module 302 may comprise one or more than one memory and one or more than one processor, wherein the one or more than one memory stores one or more than one instruction module, which is configured to be executed by the one or more than one processor; the one or more than one instruction module comprises: a combination module which is configured to perform two-two combination on the n paths of sound signals undergoing lowpass filtering to obtain N groups of sound signal combinations, a comparison module which is configured to respectively solve the difference values of amplitudes of sound signals between two paths of sounds of each sound signal combination and compare the obtained difference values of amplitudes of the N sound signals with the set threshold value, and a determining module which represents that at least one path of sound signal is stronger than other paths of signals when the difference value of amplitude of a certain sound signal or the difference values of amplitudes of several sound signals exceeds/exceed or equals/equal to the set threshold value, that is information input possibly exists.

An executing module 701, which is configured to receive a control signal output by the processing module 302, output a notification message to the user of the head-wearing device, and remind the user of noticing the existence of information input from the outside.

For example, the executing module 701 may comprise a vibrating device, which vibrates after receiving the control signal output by the processing module 302, so as to notify the user of noticing information input from the outside.

In another embodiment of the present application, the information processing device may also comprise: n lowpass filters 304 configured to perform lowpass filtering processing on the n paths of sound signals collected by then sound collecting devices 301; and a threshold value setting module 305 configured to set the threshold value, functions thereof are as previously mentioned, and the descriptions thereof are omitted herein.

The information processing device of the present embodiment can exist by being independent from the immersive head-wearing device, can capture outside sound signals automatically, and can remind the user by a vibrating device arranged therein or other manner. Such information processing device has the advantages of being used in cooperation with head-wearing devices of different types, or being used in cooperation with head-wearing devices which do not support an extended function themselves. Such information processing device can also be applied to other application environments besides the head-wearing device, and is more convenient and flexible in use.

To sum up, the information processing device of the present application may be integrated in the head-wearing device, and also may be designed as a device which is independently worn by the user. The information processing device can collect outside sound signals when the user wears the head-wearing device, and trigger a specific notification operation to remind the user when judging that information input from the outside exits by processing the collected signals, and thus enhancing the practicably of the head-wearing device.

The foregoing descriptions are merely exemplary embodiments of the present application, but are not intended to limit the present application. Any modification, equivalent replacement, or improvement made within the spirit and principle of the present application shall fall within the protection scope of the present application.

It is noted that the various modules, submodules, units, subunits, and components in the present disclosure can be implemented using any suitable technology. For example, a module or a unit can be implemented using processing circuitry. In an example, a module or a unit can be implemented using one or more integrated circuits (IC). In another example, a module or a unit can be implemented as one or more processors executing software instructions. In another example, interface circuitry is used to implement a receiving unit (or module) and/or a sending unit (or module).

What is claimed is:

1. An information processing method, comprising:
collecting, via a plurality of microphones, a plurality of sound signals;
generating, by processing circuitry of an information processing device, a combined sound signal for each of at least one pair of the plurality of sound signals, each combined sound signal being a combination of a respective pair of the plurality of sound signals;
calculating, by the processing circuitry, an amplitude difference between the sound signals of each of the at least one pair of the plurality of sound signals;
comparing, by the processing circuitry, the amplitude difference between the sound signals of each of the at least one pair of the plurality of sound signals with a preset threshold value;
generating, by the processing circuitry, a notification message when the amplitude difference between the sound signals of one or more of the at least one pair of the plurality of sound signals is greater than or equal to the preset threshold value based on the comparison; and
outputting, by the processing circuitry, the notification message for presentation to a user.

2. The method of claim 1, wherein the generating the combined sound signal for each of the at least one pair of the plurality of sound signals comprises:
generating the combined sound signal for each of a plurality of random pairs of the plurality of sound signals.

3. The method of claim 1, wherein each of the at least one pair of the plurality of sound signals includes the sound signals captured by adjacent ones of the microphones.

4. The method of claim 1, further comprising:
dynamically adjusting the preset threshold value based on a noise level of an environment in which a head-wearing apparatus to which the notification is output for presentation is used.

5. The method of claim 1, further comprising:
changing the preset threshold value according to an average amplitude value of the plurality of sound signals when each amplitude difference between the sound signals is lower than the preset threshold value.

6. The method of claim 1, wherein
the notification message includes a voice message or prompt tone; and
the outputting includes outputting the voice message or the prompt tone for playback by a head-wearing apparatus.

7. The method of claim 1, wherein
the notification message is a graphic or text message; and
the outputting includes outputting the graphic message or the text message to a display device of a head-wearing apparatus for display to the user.

8. The method of claim 1, wherein
the notification is a vibrating notification message; and
the outputting includes sending out a vibrating signal to a vibrating device.

9. The method of claim 1, further comprising:
merging the sound signals of each of the at least one pair of the plurality of sound signals having the amplitude difference that is greater than or equal to the preset threshold value; and
the outputting includes outputting the merged sound signal for playback by a head-wearing apparatus.

10. A head-wearing apparatus, comprising:
a display device configured to display an image;
a sound playing device, including at least one speaker, configured to play sound;
a plurality of microphones configured to capture a plurality of sound signals; and
processing circuitry configured to:
receive the plurality of sound signals captured by the plurality of microphones;
generate a combined sound signal for each of at least one pair of the plurality of sound signals, each combined sound signal being a combination of a respective pair of the plurality of sound signals;
calculate an amplitude difference between the sound signals of each of the at least one pair of the plurality of sound signals;
compare the amplitude difference between the sound signals of each of the at least one pair of the plurality of sound signals with a preset threshold value;
generate a notification message when the amplitude difference between the sound signals of one or more of the at least one pair of the plurality of sound signals is greater than or equal to the preset threshold value based on the comparison; and
output the notification message for presentation to a user.

11. The head-wearing apparatus of claim 10, wherein the plurality of microphones are uni-directional microphones.

12. The head-wearing apparatus of claim 11, wherein the plurality of uni-directional microphones are arranged to capture sound from different directions of the head-wearing apparatus.

13. The head-wearing apparatus of claim 10, wherein the processing circuitry includes a digital signal processing (DSP) chip, and the DSP chip is configured to:
convert each of the plurality of sound signals captured by the plurality of microphones into a respective digital signal, and obtain a plurality of digital signals after the conversion;
generate a combined digital signal for each of at least one pair of the plurality of digital signals, each combined digital signal being a combination of a respective pair of the plurality of digital signals;
calculate an amplitude difference between the digital signals of each of the at least one pair of the plurality of digital signals;
compare the amplitude difference between the digital signals of each of the at least one pair of the plurality of digital signals with the preset threshold value; and
output a control signal when the amplitude difference between the digital signals of one or more of the at least one pair of the plurality of digital signals is greater than or equal to the preset threshold value based on the comparison.

14. The head-wearing apparatus of claim 10, wherein the processing circuitry includes a gate circuit, and the gate circuit is configured to:
perform differential operations on the sound signals of each of the at least one pair of the plurality of sound signals, each differential operation generating a respective differential output;
compare each differential output with a preset amplitude, each comparison generating a respective comparison output; and
perform OR operations on the comparison outputs, and output a control signal based on the OR operations.

15. The head-wearing apparatus of claim 10, wherein the processing circuitry is further configured to:
set the preset threshold value.

16. An information processing device, comprising:
a plurality of microphones configured to capture a plurality of sound signals; and
processing circuitry configured to:
> receive the plurality of sound signals captured by the plurality of microphones;
> generate a combined sound signal for each of at least one pair of the plurality of sound signals, each combined sound signal being a combination of a respective pair of the plurality of sound signals;
> calculate an amplitude difference between the sound signals of each of the at least one pair of the plurality of sound signals;
> compare the amplitude difference between the sound signals of each of the at least one pair of the plurality of sound signals with a preset threshold value;
> generate a notification message when the amplitude difference between the sound signals of one or more of the at least one pair of the plurality of sound signals is greater than or equal to the preset threshold value based on the comparison; and
> output the notification message for presentation to a user.

17. The information processing device of claim 16, wherein the plurality of microphones are uni-directional microphones.

18. The information processing device of claim 17, wherein the plurality of uni-directional microphones are arranged to capture sound from different directions of the information processing device.

19. The information processing device of claim 16, wherein the processing circuitry includes a digital signal processing (DSP) chip, and the DPS chip is configured to:
> convert each of the plurality of sound signals captured by the plurality of microphones into a respective digital signal, and obtain a plurality of digital signals after the conversion;
> generate a combined digital signal for each of at least one pair of the plurality of digital signals, each combined digital signal being a combination of a respective pair of the plurality of digital signals;
> calculate an amplitude difference between the digital signals of each of the at least one pair of the plurality of digital signals; and
> compare the amplitude difference between the digital signals of each of the at least one pair of the plurality of digital signals with the preset threshold value, and output a control signal when the amplitude difference between the digital signals of one or more of the at least one pair of the plurality of digital signals is greater than or equal to the preset threshold value based on the comparison.

20. The information processing device of claim 16, wherein the processing circuitry includes a gate circuit, and the gate circuit is configured to:
> perform differential operations on the sound signals of each of the at least one pair of the plurality of sound signals, each differential operation generating a respective differential output;
> compare the each differential output with a preset amplitude, each comparison generating a respective comparison output; and
> perform OR operations on the comparison outputs, and output a control signal based on the OR operations.

* * * * *